United States Patent
Cool et al.

(10) Patent No.: US 11,748,507 B2
(45) Date of Patent: Sep. 5, 2023

(54) CONCEPTS OF PROVIDING INFORMATION ABOUT A DEVICE

(71) Applicant: Sony Corporation, Tokyo (JP)

(72) Inventors: Tom Cool, Stuttgart (DE); Daavid Hentunen, Stuttgart (DE); Olivier Demarto, Stuttgart (DE); Fabien Cardinaux, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 861 days.

(21) Appl. No.: 16/364,179

(22) Filed: Mar. 26, 2019

(65) Prior Publication Data

US 2019/0303612 A1    Oct. 3, 2019

(30) Foreign Application Priority Data

Mar. 29, 2018 (EP) .................................. 18165060

(51) Int. Cl.
| | |
|---|---|
| *G06F 11/34* | (2006.01) |
| *G06F 3/0484* | (2022.01) |
| *G06F 9/451* | (2018.01) |
| *G06F 21/62* | (2013.01) |
| *G06F 21/32* | (2013.01) |
| *G06F 3/01* | (2006.01) |

(52) U.S. Cl.
CPC .......... *G06F 21/6245* (2013.01); *G06F 3/015* (2013.01); *G06F 3/0484* (2013.01); *G06F 9/453* (2018.02); *G06F 11/3438* (2013.01); *G06F 11/3452* (2013.01); *G06F 21/32* (2013.01); *G06F 2203/011* (2013.01)

(58) Field of Classification Search
None
See application file for complete search history.

(56) References Cited

U.S. PATENT DOCUMENTS

| | | | |
|---|---|---|---|
| 8,680,992 B2* | 3/2014 | Kruglick ............ | G06Q 30/0278 340/540 |
| 2005/0213511 A1 | 9/2005 | Reece et al. | |
| 2006/0136776 A1 | 6/2006 | Campello et al. | |
| 2009/0118899 A1 | 5/2009 | Carlson | |
| 2010/0161506 A1* | 6/2010 | Bosenick ............... | G06Q 30/02 705/347 |
| 2013/0165072 A1* | 6/2013 | Hoover ................. | H04W 12/35 455/411 |
| 2013/0339170 A1* | 12/2013 | Stremsdoerfer ....... | G06Q 40/02 705/38 |

(Continued)

OTHER PUBLICATIONS

Samsung, "Usage Tracker: Control and Monitor Usage by Device and User", Jun. 25, 2015, 8 Pages.

*Primary Examiner* — Christopher J Fibbi
(74) *Attorney, Agent, or Firm* — XSENSUS LLP

(57) ABSTRACT

A method of providing information about a device is proposed. According to the method, user-specific information of a first user is provided to the device. The user-specific information is related to a user experience of the device used by the first user. The user-specific information is stored in a non-volatile memory of the device. Upon a request of a second user, device-specific information based on the stored user-specific feedback information from the non-volatile memory of the device is outputted to the second user. A device with an electrical circuit, non-volatile memory, and an output circuit is proposed.

14 Claims, 2 Drawing Sheets

(56) References Cited

U.S. PATENT DOCUMENTS

| | | | |
|---|---|---|---|
| 2014/0038556 A1* | 2/2014 | De Sousa | H04W 12/06 |
| | | | 455/411 |
| 2015/0006829 A1 | 1/2015 | Rajwan et al. | |
| 2015/0206206 A1* | 7/2015 | Puente | G06Q 30/0645 |
| | | | 705/307 |
| 2016/0110279 A1* | 4/2016 | Worthington | G06F 11/3428 |
| | | | 714/47.1 |
| 2016/0335697 A1* | 11/2016 | Bawri | G06Q 30/0629 |
| 2018/0025392 A1* | 1/2018 | Helstab | G06Q 10/10 |
| | | | 705/306 |
| 2019/0244427 A1* | 8/2019 | Sun | G06F 3/011 |

* cited by examiner

CONCEPTS OF PROVIDING INFORMATION ABOUT A DEVICE

CROSS-REFERENCE TO RELATED APPLICATION

The present application claims priority to European Patent Application 18165060.7 filed by the European Patent Office on Mar. 29, 2018, the entire contents of which being incorporated herein by reference.

FIELD

Example implementations of the present disclosure relate to methods of providing information about a device and to devices providing information.

BACKGROUND

A device may be shared amongst different users, e.g. provided by a sharing service. Alternatively, a device could be sold to a new owner. Shared devices may be any electronic or mobile consumer devices used by a plurality of users. A potential user of the device may be a user of the sharing service or may consider purchasing the device. The potential user may wish to have information about the device in order to know whether she would be satisfied with the device.

Some property of the device might not be perceivable by the potential user at first sight. It may be difficult for the potential user to decide whether or not she should use the device. Therefore, it may be useful for a potential user of the device to have information about the device. Information might be helpful for a decision about using or purchasing the device. Other concepts may provide information of new devices based on user reviews for example. However, according to other concepts only generalized information about a kind of device may be provided.

There may be a demand for improved concepts for providing information about a device.

SUMMARY

This need is met by methods and devices in accordance with the independent claims. Advantageous embodiments are addressed by the dependent claims.

An example of the disclosure relates to a method of providing information about a device. The method comprises providing user-specific information of a first user. The user-specific information is related to a user experience of the device used by the first user. The user-specific information is provided to the device. The method comprises storing the user-specific information in a non-volatile memory of the device. The method further comprises outputting device-specific information based on the stored user-specific information from the non-volatile memory of the device. The device-specific information is outputted upon a request of a second user.

Another example relates to a device configured to provide information about itself. The device comprises an electrical circuit configured to provide user-specific information of a first user. The user-specific information is related to a user experience of the device used by the first user. The device comprises a non-volatile memory configured to store the user-specific information. The device further comprises an output circuit configured to output the stored user-specific information from the non-volatile memory. The output circuit is configured to output the stored user-specific information upon a request of a second user.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

A state of a shared device can for example depend on prior usage of the device. For example, a device might have been misused once or several times, and the functionality of the shared device may deteriorate. A prospective user of such device might experience problems e.g. with respect to the functionality of the shared device or to a comfort provided by the shared device. A device may sometimes not meet expectations of a user. Therefore, providing information about the device based on former user experience of former users of the device is proposed. The user can decide based on the provided information whether he wants to use the device.

Figure 1:
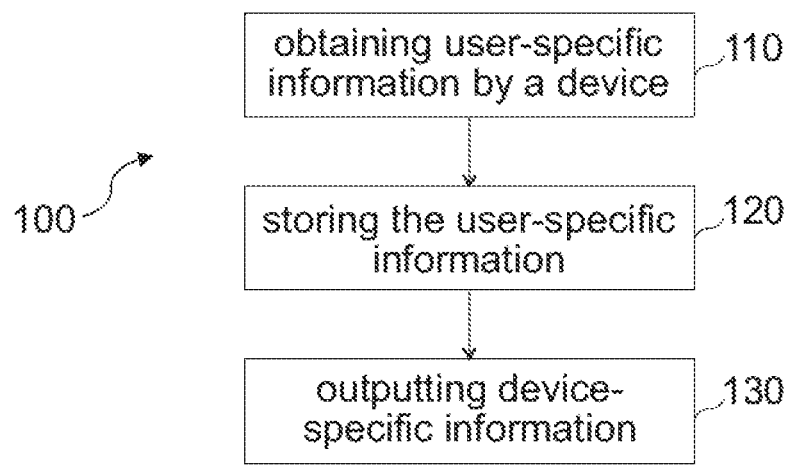
FIG. 1 shows a flow chart of a method for providing information about a device.

FIG. 1 shows a flow chart of a method 100 for obtaining information about a device. Method 100 comprises obtaining 110 user-specific information of a first user to the device.

Obtaining may comprise receiving or providing user-specific information. The user-specific information is related to a user experience of the device used by the first user. User-specific information could comprise user-specific feedback information provided to the device by the user, and/or user-specific information could comprise measured user experience, e.g. determined by biometric sensors. Biometric sensors can be biometric sensors of the device and/or biometric sensors of a user device connected to the device and transmitting (sensor) data to the device. Method 100 comprises storing 120 the user-specific information in a non-volatile memory of the device. Further, method 100 comprises, upon request of a second user, outputting 130 device-specific information based on the stored user-specific information from the non-volatile memory of the device. The device-specific information may be outputted to the second user.

According to an embodiment of the method, a user or first user may give user-specific information, e.g. user-specific feedback information, about the device to the device. The device may be e.g. any kind of electrical device or mobile device. The device may be a consumer device, e.g. a camera or a mobile phone, or a transportation device, e.g. a vehicle or a bicycle. The user-specific information may be used to provide information about the device to a second user. The user-specific information may be valid for the specific or individual device instead of e.g. for a group of all devices of a same kind like the device, e.g. devices of a same type of a series production.

According to an embodiment of the method, alternatively or additionally to providing user-specific feedback information, the user-specific information can be collected or determined using sensors or a sensor system of the device. Sensors may be device sensors configured to measure a usage pattern of the device, and a measured user experience can be determined by evaluating the usage pattern measured by the device sensors. For example, sensors can be any sensors configured to capture, at different times, information related to an emotional state of a current user of a device, in one embodiment in connection with a current usage situation of the device. In particular, sensors may comprise biometric sensors configured to detect a vital state of the user during usage of the device. The vital state can comprise an activity of the user and/or sweating of the user. An emotional state of the user in a usage situation, and accordingly her measured user experience in that situation, may be derived based on the vital state. For example, the device is a car and a negative user experience of the user could be measured or determined if the user sweats in regular road conditions, e.g. indicating the air condition is too weak or the user feels uncomfortable. A positive user experience of the user could be measured or determined if e.g. the blood pressure or adrenaline level of the user rises while accelerating the car on a highway, as e.g. the user enjoys the engine power of the car. A measured user experience, e.g. an overall user experience, for one use by a particular user may be generated from a plurality of measured user experiences and/or emotional state measurements at different times during that use. For example, extreme emotional states (anger, excitement) may be mainly considered and their number of occurrence may be compared to that of other users during a use of comparable length. Overall user experience (or overall rating) may be created from, for example, a weighted average of sub ratings determined during the use. Weights of individual occurrences may depend on user preferences and/or length of the occurrences and/or frequency of the occurrences. For example, a user might give 5 out of 5 stars for some feature but not regard that feature really important in overall rating (low weight) so overall rating might be low because of that. This can mean that the sub ratings themselves might give more valuable information for the next user as he might value the same feature very high and therefor the expected overall rating for him should also be high.

There are algorithms for producing ratings from these kind of data. Could we just say self-learning system or machine learning can be used to find the "rules" from the collected data which tell the probable sub ratings and overall rating?

The first user may input user-specific feedback information via an input terminal of the device. The input terminal might be a touch display or a keyboard or at least one button. Alternatively, the user may input user-specific feedback information e.g. via a mobile device connected to the device. The mobile device might be a mobile phone or a tablet of the user and may be connected to the device via a device to device connection, e.g. via a Bluetooth or a WLAN (wireless local area network) connection, or via the internet. The user might give user-specific feedback information to an online service, a website or an online application and the user-specific feedback information may be obtained from an online server connected to the device.

In an embodiment, obtaining 110 user-specific information may comprise requesting user-specific feedback information from a user of the device and providing it to the device. Requesting user-specific feedback information may comprise showing a message to the user to remind him to give user-specific feedback information. Requesting may comprise providing or proposing to the user a selection of at least to options of user-specific feedback information that the user may select. Selecting proposed options may increase a user convenience as it may enable to give user-specific feedback information in an efficient way.

The user-specific information is related to a user experience of the device. The user experience may relate to a functionality of the device and/or to a comfort of the device experienced by the user. User experience may relate to subjective user experience, e.g. a user might or might not like the device because its price tag was too high/low, it smells wrong (cigarette smoke), device manufacturer's reputation is not so good or the device's previous owner was some famous person. User experience may cover what the user thinks and feels about the device.

For example, obtaining user-specific information can comprise a rating of a functionality of the device or rating a quality of the device. For example, a user can give feedback with respect to her satisfaction or user experience while using the device. If the device shows full functionality, the user may give user-specific feedback information comprising a rating of e.g. 100% or a rating of more than 90%. For example, a function of the device may not meet an expectation of the user and the user may give user-specific feedback information comprising a rating of less than 90%. In this way, the user may rate the device e.g. with more than 40% and/or less than 80% if the device shows a partially functionality, or may rate the device with less than 30%, e.g. if the device does not have a functionality according to an expectation of the user. A rating may classify a functionality of the device between full function of the device (e.g. with a rating of 100%) and no function of the device (e.g. with a rating of 0%). A result may be that information about a user experience with respect to using the device can be provided to the device.

Storing 120 the user-specific information in a non-volatile memory of the device can comprise writing data comprising the user-specific feedback information on at least one of a flash memory, a hard disk drive, a solid state drive, a floppy disk, a magnetic tape, and an optical disc of the device. The one skilled in the art will appreciate that other kinds of storages may be used. A non-volatile memory can comprise memory retrieving information also when being turned off and back on. A non-volatile memory can comprise memory that prevents information written on it from being deleted afterwards. For example, after storing the user-specific feedback information in the non-volatile memory it may be indelible or unamendable. The non-volatile memory may be a programmable read only memory (PROM). A PROM may be a read-only memory that can only be written once. Thereafter, the written data may be read out as often as desired but it may be no longer possible to change the data.

The method 100 comprises outputting 130 device-specific information upon a request of a second user. The second user may be a user considering to use or to buy the device. The user might desire information about the user experience of the device. The second user may be a person or a machine, e.g. an automatic checkpoint deciding whether or not to let the device pass the checkpoint. Before letting the device pass, the checkpoint could send a request message to request outputting 130 device-specific information. Device-specific information is based on the stored user-specific feedback information from the non-volatile memory of the device. For example, outputting comprises outputting the stored user-specific feedback information. For example, outputting comprises processing the stored user-specific feedback information and outputting aggregated user-specific feedback information, e.g. an average value of a rating and/or a rating of a specific first user and/or a rating of a specific operation mode of the device. Outputting the device-specific information may result in providing information about the device or a user experience of the device to the second user, e.g. a prospective user of the device. The second user may have the possibility to assess whether he would probably have a good user experience with the device based on the device-specific information providing the second user with information about the user experience of the device.

Optionally, providing the user-specific feedback information may comprise inputting the user-specific feedback information via a graphical user interface (GUI) of the device. In other words, the device may comprise a graphical user interface and be programmed to receive user-specific feedback information via the GUI. For example, at least two proposed rating scores may be provided to the first user on the GUI and the first user might select one rating score to give her user-specific feedback information according to her experience with the device. For example, a proposed rating as the user-specific feedback information may comprise five rating degrees and the user may rate the device with a respective rating degree according to her user experience, e.g. with respect to the user experience of the device. In-putting the user-specific feedback information via the GUI of the device may increase an efficiency of providing user-specific feedback information.

Optionally, providing the user-specific information may comprise receiving the user-specific information related to a second device from a second device and/or from an internet server communicating with the device. The device may receive the user-specific information from a second device connected to the device directly (e.g. by a wireless connection) or via the internet. The second device may have the same or at least similar feature characteristics like the device itself. The second device may be of a same kind as the device or have at least some features like the device itself. For example, the device may be a car and the second device may be a similar car, e.g. with respect to an equipment, a motor power, a size of a cabin and/or a trunk, and/or an entertainment system. In other words, the second device may have features comparable to features of the device. The device and the second device may comprise sensors to detect a usage or usage pattern of the respective device. For example, a first user of the second device may give user-specific feedback information as feedback to the second device. The second device may store the user-specific feedback information in combination with a usage pattern of the second device present while the first user of the second device gives user-specific feedback information. The device may use the sensors of the device to determine a usage pattern of the device. If the usage pattern is similar to the usage pattern of the second device, the device can use the user-specific feedback information of the second device as provided user-specific feedback information. Similar may be sensor-dependent and can comprise a speed of a car, a frequency of setting functions of the device, a maximum acceleration of the device, e.g. differing by maximum 10% respectively. Similar may comprise a correlation of the respective usage patterns or respective functions larger than 0.8. In this way, user-specific feedback information may be provided without inputting user-specific feedback information by a user of the device. For example, the user-specific feedback information may be estimated based on sensor data of the device determining a usage of the device.

For example, providing the user-specific information comprises providing exclusively user-specific feedback information of an authenticated or identified first user of the device. In other words, only identified (or authenticated) users may be entitled to rate the device or to give user-specific feedback information. Accordingly, before providing user-specific feedback information of the first user, the first user may be identified, e.g. by the device. After identification of the user, it may be determined whether the first user is authenticated or not. For example, authenticated users are provided in authentication data in the device and the identified user can be compared with the authentication data. For example, identifying may comprise providing using a fingerprint reader and/or a password reader and/or an iris reader and/or a speech recognition system (and/or other biometrical sensors) and/or an image recognition system. The authentication data may accordingly comprise fingerprints, passwords, iris patterns, speech patterns and/or images of authenticated users, respectively. Authenticated users may be owners or legal users of the device. In this way, a reliability of the user-specific feedback information may be increased.

For example, identified users may be categorized in groups, e.g. categorized by their profession. Some authenticated users may be professional users and some authenticated users may be private users. Device-specific information may be given to the second user with a respective assignment to a respective group. The second user may be able to decide whether she wants to have information about the user experience of the device from users of a specific group. For example, the user may be a professional and may request device-specific information based on user-specific feedback information of a group of professional first users.

According to an embodiment, obtaining the user-specific information comprises receiving information indicative of the first user's subjective user experience with the device. For example, the first user may rate his experience, e.g. a functionality, of the device impossible to rate e.g. by sensors of the device. For example, the sensors of the device could only measure the functionality partially but may miss some aspects of the functionality possibly important for a user of the device. For example, the first user may have a good experience with the device because the device may work without errors from his subjective point of view. Then, the first user could give his subjective rating as user-specific feedback information that enables to provide realistic information about the device. For example, the first user might use the device in a specific situation or environment (usage scenario) and experience good functionality, and the first user can rate the device according to his specific experience. The embodiment may further increase a significance of information about the device and/or may provide information with respect to specific usage scenarios.

Optionally, the user-specific feedback information from the first user may be requested in at least one operation mode of the device. For example, the device may provide at least two operation modes (e.g. an auto-mode and a manual mode) and the user-specific feedback information may be provided for each operation mode. For example, in a first operation mode functionality may be high whereas in a second operation mode functionality may be low. It may be possible to discriminate the device-specific information with respect to the operation modes of the device. The second user may be able to decide whether one operation mode with e.g. low functionality is important for him or whether he could use the device also in case of low functionality of the operation mode anyway.

In an embodiment, user-specific feedback information from the first user may be requested frequently. The user-specific feedback information may be requested once per hour and/or once per day and/or once per week. The user-specific feedback information from the first user may be requested when an operation mode of the device changes. Frequently requesting may lead to a constant providing of user-specific feedback information and enable to provide device-specific information with a high reliability and significance.

For example, storing the user-specific information comprises securely storing the user-specific information in the memory. The memory may be tamper protected. In other words, the method may provide authentic user-specific feedback information in the memory and faking may be impossible. As already described it may be possible to use a PROM and prevent user-specific feedback information once written on the memory to be deleted. In this way a reliability of the user-specific feedback information may be high and accordingly the device-specific information outputted to the second user may be reliable. Securely storing may comprise storing the user-specific information on the memory of the device and on an additional memory. The respectively stored user-specific feedback information may be compared before outputting the device-specific information. The device-specific information may be outputted only if the respectively stored user-specific information is identical.

According to an embodiment, the user-specific information may be additionally stored on a remote cloud server or a server having access to the internet. The user-specific information of the remote cloud server may be used to be compared with the user-specific feedback information on the device as described above. The user-specific information on the cloud server may be provided to another device similar to the device, such that respective user-specific information may be estimated on the other device depending on respective usage patterns of the device and the other device.

Optionally, the device-specific information is based on aggregated user-specific feedback information stored in the non-volatile memory and sensor data of the device. Sensor data may indicate that the device is frequently used when the first user gives a high rating score and user-specific information comprising a high rating score may be considered stronger than a low rating score of the user-specific feedback information given at within a period when the device was less frequently used. User-specific information may be processed with adaptive multipliers. For example, if the device is frequently used (e.g. every day, more than 2 hours per day, or more than 4 hours per day) user-specific feedback information may be automatically generated with a high rating score (e.g. 80% if the device is used more than 2 hours per day and/or 95% if the device is used more than 4 hours per day). It can be estimated that a user using the device frequently has a good user experience with the device when often using the device. Combining user-specific information with sensor data may increase a significance of the information about the device.

Optionally, the device-specific information comprises a probability of a future user experience and/or functionality of the device. For example, based on the user-specific feedback information a probability value may be generated and the second user may easily recognize whether a good user experience and/or functionality of the device will be more or less probable. For example, the probability value can depend on rating scores of the user-specific feedback information. An average rating score may be 80% and the probability value may be 80% as well. For example, the probability value may indicate the percentage of first users who gave rating scores higher than 50% compared to all first users. For example, the probability value may consider only user-specific feedback information given within a specific duration, e.g. within the last 4 week, the last 2 months or the last year before outputting the device-specific information.

Optionally, device owner information indicating a legal user of the device may be stored in the non-volatile memory. For example, the first user of the device may be the legal owner of the device and device owner information may comprise the first user. For example, only the legal user or owner according to the device owner information is permitted to amend the device owner information. It may be possible to amend the device owner information or to add new legal owners to the device owner information. For example, a legal owner can be identified by using biometrical sensors of the device or by using a code. The legal owner may permit amending the device owner information, e.g. for a predefined duration after permitting the amendment. The predefined duration may be shorter than 30 min. (or shorter than two hours, shorter than one day or shorter than one week) and/or longer than 1 min. (or longer than 15 min. or longer than 30 min.) after the authenticated user has enabled the amendment. For example, if the legal owner sells the device, information about the new owner can be added to the device owner information within the predefined duration.

Figure 2:
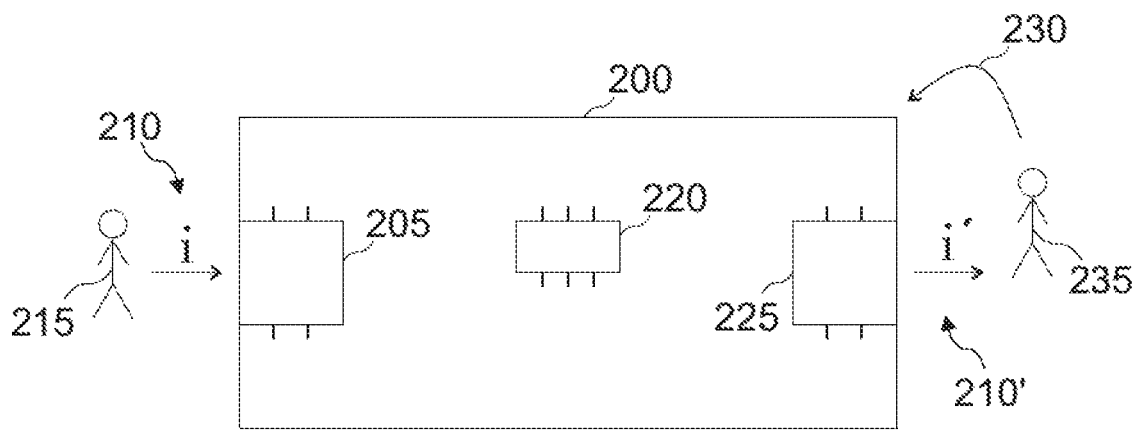
FIG. 2 shows a schematic illustration of a device.

FIG. 2 shows a schematic illustration of a device 200. The device 200 comprises an electrical circuit 205. The electrical circuit 205 is configured to provide user-specific feedback information 210 of a first user 215. The user-specific feedback information 210 is related to a user experience of the device 200 used by the first user 215. The device 200 comprises non-volatile memory 220 configured to store the user-specific feedback information 210. The device further comprises an output circuit 225 configured to output the stored user-specific feedback information 210' from the non-volatile memory 220 upon a request 230 of a second user 235. The device 200 is configured to perform any of the previously proposed methods.

The outputted user-specific feedback information 210' can equal the user-specific feedback information 210 or can be based on user-specific feedback information 210. For example, the user-specific feedback information 210' is device-specific information as described above. The first user may be able to request device-specific information like the second user.

For example, device 200 may be a shareable device provided by a sharing service. For example, the second user may consider renting (or using or buying) the device 200. Device 200 may be a car, a bicycle, a camera, a game console, a mobile phone, a working tool or a public working space with a computer. Before renting the device 200, the second user 235 may request device-specific information about the device to facilitate his decision about renting (or using or buying) the device. The device-specific information may give aggregated information of prior user experience of users of the device. For example, if prior users had a good experience with the device, the second user may likely also have a good experience and decide to use the device.

For example, the second user may use an application of a mobile phone (not shown) to request the device-specific information of the device 200. For example, the device-specific information may be outputted to the user's mobile phone. In this way it may be easy and convenient for the second user to get information about the device, for example it may be unnecessary to see the device physically. For example, the user may make a reservation for the device if he decides that the device will show a functionality expected by him, wherein he can make the decision based on reliable information about the device provided by the device or outputted by the output circuit of the device, respectively.

In an embodiment, device 200 comprises at least one biometric sensor configured to determine a biometric user behavior for generating user-specific information obtainable by the device. The at least one biometric sensor is configured to provide a vital state of the user for determining the user experience of the user during using device 200. A biometric sensor can be one of a blood pressure monitor, an iris scanner, a camera system configured to determine a physical activity of the user, and a microphone system (possibly comprising speech recognition) configured to determine a state of excitement of the user by evaluating speech of the user.

Figure 3:
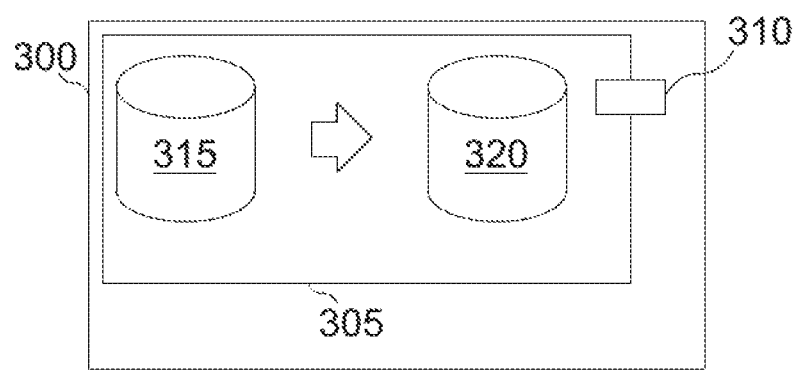
FIG. 3 shows a schematic illustration of a shareable device.

FIG. 3 shows a schematic illustration of a shareable device 300. The shareable device 300 comprises a tamper-proof storage 305 and an application programmable interface (API) 310. The tamper-proof storage 305 comprises a data logger 315 for continuously logging usage data or user-specific feedback information or a rolling usage log. The logged data can be processed to achieve aggregated stats 320 comprised by the tamper-proof storage 305.

The shareable device 300 may be a smart device configured to track its own usage by at regular intervals updating timestamped usage logs on a tamper-proof storage inside the device. The storage updates counters and averages itself. The aggregated stats 320 are readable through the API 310 e.g. to the rest of the device 300. With authenticated access through the API log entries can be added or read. It may be impossible to delete log entries from the tamper-proof storage. The API may enable public access (without authentication) for read-only, e.g. may enable reading the aggregated data for every second user (including authenticated users). The API may enable access for read/write usage logs to the tamper-proof storage only for authenticated users.

An example relates to connected cars in a car sharing service. The car may comprise an electrical circuit configured to provide user-specific feedback information of a first user, the user-specific feedback information being related to a user experience of the device used by the first user and non-volatile memory configured to store the user-specific feedback information. The car may comprise an output circuit configured to output the stored user-specific feedback information from the non-volatile memory upon request of a second user. Electrical circuit, memory and output circuit may be integrated in an infotainment system of the car. Timestamped logs of a user, e.g. the first user, comprising e.g. odometer data, accelerometer data and location data may be added every 24 hours to the tamper-proof storage by the car systems software, using the API with proper authentication. The tamper-proof storage may execute a number of configured aggregations itself at each update and save the stats (e.g. total mileage, last user, average km per day of the last 30 days). The aggregated stats (or aggregated statistics) are readable through the API. Reading the aggregated stats may be possible without extra authentication.

Examples relate to an apparatus and a method for providing trustworthiness rating regarding an entity. Examples may enable providing trustworthy information about an unknown device to a potential new user of the device regarding whether or not the new user will most likely have a good user experience while using the device. Examples may enable preventing sale of stolen goods. Examples enable providing information about whether or not some autonomous entity is trustworthy.

In the sharing economy, a key ingredient for success of goods sharing may be the trust that a potential user might have in a particular device. Proposed examples may enable to increase the confidence of a user by providing trustworthy information about a device.

Other concepts may enable collecting information about a device itself regarding its current internal state and how another device has been used in the past. However, by using other concepts it may be impossible to provide trustworthy way of telling the aggregated user experience result of its previous users to the potential new user. For example, the other device might not have just the right kind of sensor present in it that would detect some serious defect in it. Such defect would result in a bad user experience for the new user.

Examples propose having a device with nonvolatile trusted storage apparatus. A trusted storage may contain device identifiable information (DII), and it can optionally also be used to collect encrypted usage parameters about the device in order to give confidence that the trusted storage has not been taken from a second device and replaced with the trusted storage of the first device.

Examples may proceed to identify its current user by biometric, electromagnetic, usage patterns, encryption and/or by other means. A user of the device can be for example a living entity, a device or a virtual (an artificial) entity but is not limited to these.

While the device is in use, it may ask from the user the user experience rating related to the use of the device. A rating can be for example stars from 1 to 5. Real user experience rating should be subjective and therefore something that the device cannot independently and very reliably collect on its own.

Alternatively the device can independently collect the user experience rating from the data that it collected while the device was in use. Collected data may include usage patterns. Usage patterns may include for example duration or type of usage. This data can then be compared to other usage patterns and their related ratings. Matching or similar usage patterns can be used to infer that the user experience rating should also be similar.

Alternatively the device can independently query other devices, or from the cloud, about its current user's, and/or users with similar identity, usage patterns/ratings related to similar devices, and based on the comparison between current usage patterns/ratings and usage patterns/ratings of the similar device, it can deduce the user experience of the current device. Similar user identities using devices with similar characteristics may yield to similar user experience.

For example, if a user with similar or identical user identity has previously used another device that has similar characteristics (similar model of device, color and so forth) and history of usage patterns (as old or similarly worn), then the current device can deduce that the previously recorded user experience of the another device by another or the same user should match the user experience of the current device for the current user.

User experience rating may then be stored along with the previously collected user identity to the trusted storage of the device. Use of storing of the user identity along with the user experience rating should make it difficult for a malicious 3rd party to store false ratings to the device.

When e.g. a new user of the device is about to take the device into use, the user can first query the device about its previous user experience ratings (aggregated ratings), and based on this information decide whether or not to trust the device enough. If e.g. a user deems the device trustworthy based on the previously recorded ratings, the user can, depending on the situation, either buy, lease or use the device. Alternatively the trustworthiness rating can be used in machine to machine communication to check if an autonomous device in transit (self-driving car) is trustworthy enough to pass through some checkpoint.

In an alternative embodiment, the new user might request the device about users experience ratings in specific conditions or specific type of users. For example, querying what is the rating of a camera when used indoor or rating from experienced users (in a camera, experienced users can be detected by frequent use of manual settings).

Examples may enable to prevent sale of stolen goods. A first user of a device can store its identity to the device. When the device is about to get sold, e.g., the first user of the device can be identified by the device first. Then the device may enable storing of new user identity into it for a limited time period. The second user of the device can then be identified and her identity can be stored on the device as a new owner of the device, e.g. if the new owner was identified within the limited time period.

Examples may enable ensuring that the device is trustworthy, preferable for use for the current user or has not been stolen.

The proposed method may be detectable by monitoring how a device identifies its current user and whether or not the device shows its previous user experience ratings to the current user. According to the proposed method the device may require identity of its current user to be inputted when a new owner is about to take the ownership of the device, and the device then onwards may detect the new user as an owner of the device.

The following examples pertain to further embodiments.

(1) A method or providing information about a device, comprising obtaining, by the device, or providing, to the device, user-specific information or user-specific feedback information of a first user related to a user experience and/or functionality of the device used by the first user; storing the user-specific feedback information in a non-volatile memory of the device; and, upon a request of a second user, outputting device-specific information based on the stored user-specific feedback information from the non-volatile memory of the device.

(2) The method of (1), wherein providing the user-specific feedback information comprises inputting the user-specific feedback information via a graphical user interface of the device.

(3) The method of any of (1) or (2), wherein providing the user-specific feedback information comprises receiving, at the device, the user-specific feedback information from a second device having the same or at least similar feature characteristics.

(4) The method of any of (1) to (3), wherein providing the user-specific feedback information comprises providing exclusively user-specific feedback information of an authenticated first user of the device, wherein the method comprises identifying the first user and determining whether the first user is authenticated.

(5) The method of any one of (1) to (4), wherein providing the user-specific feedback information comprises identifying a user providing the user-specific feedback information and storing the user-specific feedback information with a corresponding user's identity.

(6) The method of any of (1) to (5), wherein receiving the user-specific feedback information comprises receiving information indicative of the first user's subjective user experience with the device.

(7) The method of any of (1) to (6), further comprising requesting the user-specific feedback information from the first user in at least one operation mode of the device.

(8) The method of any of (1) to (7), wherein storing the user-specific feedback information comprises securely storing the user-specific feedback information in the memory, wherein the memory is tamper protected.

(9) The method of any of (1) to (8), further comprising storing the user-specific feedback information on a remote cloud server.

(10) The method of any of (1) to (9), wherein the device-specific information is based on aggregated user-specific feedback information stored in the non-volatile memory and/or sensor data of the device.

(11) The method of any of (1) to (10), wherein the device-specific information comprises a probability of a future user experience of the device.

(12) The method of any of (1) to (11), further comprising storing device owner information indicating a legal user of the device in the non-volatile memory, wherein only the legal user according to the device owner information is permitted to amend the device owner information.

(13) A device, comprising an electrical circuit configured to provide user-specific feedback information of a first user, the user-specific feedback information being related to a user experience and/or functionality of the device used by the first user; a non-volatile memory configured to store the user-specific feedback information; and an output circuit configured to output the stored user-specific feedback information from the non-volatile memory upon request of a second user.

(14) The device of (13), further comprising at least one biometric sensor configured to determine a biometric user behavior for generating user-specific information.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method of providing information about a shared mobile device, comprising:
   obtaining, by the mobile device, user-specific information of a first user related to user experience of the first user's use of the mobile device during at least one operation mode of the mobile device;
   storing the user-specific information in a non-volatile memory of the mobile device; and
   upon request of a second user who is a prospective user considering whether to temporarily use the mobile device for a limited period of time, outputting, on the mobile device, device-specific information indicative of the user experience of the first user's use of the mobile device based on the stored user-specific information from the non-volatile memory of the mobile device,
   wherein the user-specific information is based on sensor data of the mobile device captured during a predetermined usage situation of the first user using the mobile device, from among a plurality of predetermined usage situations, the sensor data being provided by at least one sensor of the mobile device during the predetermined usage situation,
   wherein said outputting of the device-specific information upon the request from the second user is performed as part of a checkpoint process before letting the mobile device pass to the second user for use,
   wherein the method further comprises allowing the mobile device to be used by the second user only upon passing the checkpoint process,
   wherein the mobile device is a transporter to transport the second user,
   wherein the device-specific information is based on aggregated user-specific information from a plurality of users of the shared mobile device, including the first user but excluding the second user, stored in the non-volatile memory of the mobile device, and wherein the user-specific information includes an overall user experience of the first user's use of the mobile device from the user-specific information for all of the plurality of predetermined usage situations.

2. The method of claim 1, wherein said obtaining the user-specific information includes receiving user-specific feedback information from the first user via a graphical user interface of the mobile device.

3. The method of claim 1, wherein said obtaining the user-specific information includes receiving, at the mobile device, the user-specific information related to a second device having the same or at least similar feature characteristics.

4. The method of claim 1,
wherein said obtaining the user-specific information includes providing exclusively user-specific feedback information of an authenticated first user of the mobile device, and
wherein the method further comprises identifying the first user and determining whether the first user is authenticated.

5. The method of claim 1, wherein said obtaining the user-specific information includes identifying the first user providing user-specific feedback information and storing the user-specific feedback information with a corresponding user's identity for the first user.

6. The method of claim 1, wherein said obtaining the user-specific information includes receiving information indicative of the first user's subjective user experience with the mobile device.

7. The method of claim 1, further comprising requesting the user-specific information from the first user in the at least one operation mode of the mobile device.

8. The method of claim 1, wherein said storing the user-specific information includes securely storing the user-specific information in the non-volatile memory, wherein the non-volatile memory is tamper protected.

9. The method of claim 1, further comprising storing the user-specific information on a remote cloud server.

10. The method of claim 1, wherein the sensor data includes sensor data related to an emotional state of the user caused by using the mobile device in the at least one operation mode of the mobile device.

11. The method of claim 1, wherein the device-specific information includes a probability of a future functionality of the mobile device.

12. The method of claim 1, further comprising storing device owner information indicating a legal user of the mobile device in the non-volatile memory, wherein only the legal user according to the device owner information is permitted to amend the device owner information.

13. The method of claim 1, wherein the sensor data of the mobile device includes a usage pattern of the first user's use of the mobile device during the at least one operation mode of the mobile device.

14. A mobile device, comprising:
at least one biometric sensor configured to sense a biometric user behavior related to user experience of a first user using the mobile device during at least one operation mode of the mobile device;
an electrical circuit configured to determine user-specific information of the first user related to the user experience of the first user's use of the mobile device during the at least one operation mode of the mobile device;
a non-volatile memory configured to store the user-specific information; and
an output circuit configured to output the stored user-specific information indicative of the user experience of the first user's use of the mobile device stored in the non-volatile memory responsive to a request of a second user who is a prospective user considering whether to temporarily use the mobile device for a limited period of time,
wherein the output circuit outputs the device-specific information as part of a checkpoint process to determine whether the mobile device can pass to the second user for use,
wherein the electrical circuit allows the mobile device to be used by the second user only upon passing the checkpoint process,
wherein the mobile device is a transporter to transport the second user,
wherein the device-specific information is based on aggregated user-specific information from a plurality of users of the mobile device, including the first user but excluding the second user, stored in the non-volatile memory of the mobile device, and
wherein the user-specific information includes an overall user experience of the first user's use of the mobile device from the user-specific information for all of a plurality of predetermined usage situations.

* * * * *